July 26, 1949.  R. E. SKOOG ET AL  2,477,393
REFRIGERATED DISPLAY CABINET
Filed Dec. 13, 1947
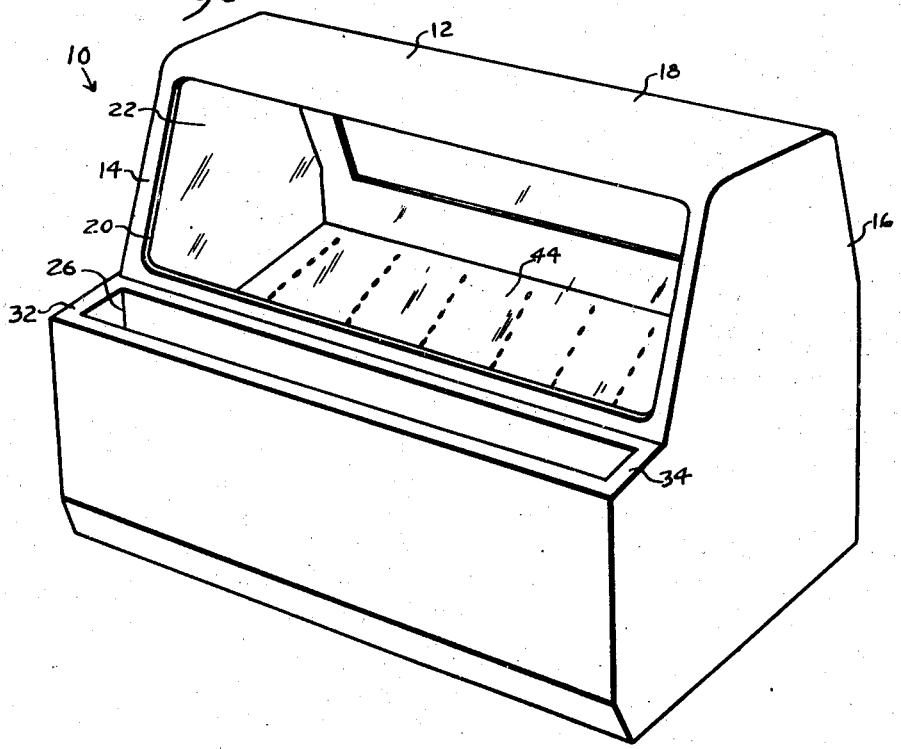
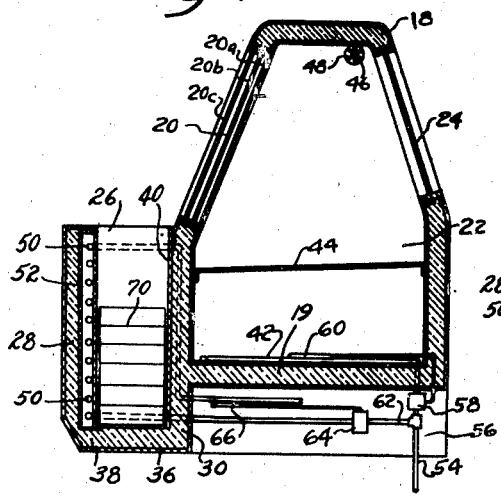
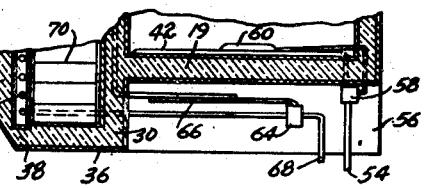
Inventors
ROBERT E. SKOOG
JOHN B. SKOOG
By P. A. Whiteley
Attorney Patented July 26, 1949

2,477,393

UNITED STATES PATENT OFFICE 2,477,393

REFRIGERATED DISPLAY CABINET

Robert E. Skoog and John B. Skoog, Minneapolis, Minn.

Application December 13, 1947, Serial No. 791,632

7 Claims. (Cl. 62—89.5)

Our invention relates to improvements in a refrigerated display cabinet of a type which has a first compartment for refrigerating and displaying perishable foodstuffs such as meat and dairy products, and a second compartment particularly adapted for preserving and displaying packaged frozen foods. In particular the invention resides in a novel form of compartment formed as an integral part of a display case and constructed in such a manner as to provide adequate refrigeration for frozen foods and also to attract the attention of customers in self-service food markets.

In recent times the use of quick frozen foods has become quite extensive, but because these foods must be maintained in a completely frozen condition until used, it is not practical to store them in the usual type of refrigerator cabinet in which other perishable foodstuffs such as meat and dairy products are stored since the low temperature which must be maintained for the frozen foods would cause injury to the other forms of foods. It has been the practice, therefore, in food stores, to provide two independent refrigerators, or sets of refrigerators for storing and preserving these two general classes of foods. It has also been the practice to locate the two types of refrigerators remote from each other, since there is no particular commercial reason for maintaining them in close relationship with each other. The disadvantage of this is that the cabinets for frozen foods occupy a considerable area of floor space which not infrequently is sufficient reason to prevent a grocer from handling these products. Furthermore, it has been the general practice to provide independent refrigeration plants for the cooling of each type of cabinet, which adds considerably to the cost of handling frozen foods.

We have recognized that most processors of frozen foods package their products in rectangular cartons which are of substantially uniform size regardless of the contents of the package. We have further recognized that, because of the uniformity and size of these packages, a long, narrow compartment of a size which is slightly greater than one dimension of the packages can be formed as a part of a refrigeration cabinet and that such an arrangement occupies only a relatively small amount of floor space over that required by the cabinet itself, and also forms a means by which the packages can be kept in a frozen condition. By forming the compartment of relatively narrow dimensions and forming its interior surface of a metal lining, the metal lining may be cooled by direct contact with refrigeration coils and the compartment can be filled with a single row of packages which are immediately adjacent a cooled surface. This arrangement permits the upper surface of the compartment to be open to the atmosphere so that a customer can readily see the frozen food products and serve himself while he is obtaining other foodstuffs from the enclosed compartment, or where the latter compartment contains items such as meat that must be cut or prepared by a clerk before a sale, the customer can select frozen foods while waiting for service.

The particular advantage of this arrangement is that the narrow compartment will always keep the foods in a frozen condition irrespective of the fact that the compartment is open to the atmosphere, and yet the compartment occupies only a very small amount of additional space over that occupied by the display cabinet.

Another advantage is that by combining the open topped refrigeration compartment with a normally closed refrigeration compartment in a display cabinet, considerable reduction in the cost of providing refrigeration for the two compartments can be effected, and where desired, the two compartments can be cooled by a single refrigeration plant, provided that plant has the necessary capacity to serve both compartments.

An object of our invention is to provide a combination refrigeration display cabinet having a first compartment for storing and displaying perishable foodstuffs which are normally maintained at a temperature above freezing, and a second compartment for storing and displaying packaged frozen foods.

Another object is to provide in combination with a display type refrigeration cabinet having a sloping glass front occupying the upper portion of the cabinet, a long, narrow open compartment on the front surface of the cabinet beneath the glass surface for displaying packaged frozen foods, the open compartment being formed with walls which are in close proximity to the packages so that the food therein may be maintained in a frozen condition by heat transfer from the cold walls of the compartment.

A further object is to provide a refrigerated compartment for holding a single row of a plurality of layers of rectangular cartons containing frozen foods, said compartment being formed with opposing walls which are spaced with relation to each other for a distance just slightly greater than one dimension of the cartons so that the cartons are closely enclosed by the walls and may be cooled by heat transfer through the walls.

Other and further objects may become apparent from the following description and claims and in the appended drawings in which:

Fig. 1 is a perspective of a refrigeration cabinet having an enclosed portion and an open compartment situated on the forward surface of the cabinet;

Fig. 2 is a vertical cross section taken through Fig. 1 showing the interior construction of the invention in side elevation; and Fig. 3 is a modification of the structure shown in Fig. 2.

Referring now to the drawings, the invention will be described in detail. The general reference numeral 10 indicates one form of the invention in which a cabinet 12 composed of end walls 14 and 16 are united with a top 18 and a bottom wall 19, and provided with a glass window 20, which, as shown, is composed of a plurality of layers of glass 20a, 20b and 20c angularly positioned with relation to the top 18 and extending from adjacent the top 18 to a lower portion of the front surface of cabinet 12. As shown, the cabinet is of a type in which a customer may observe foodstuffs within the interior 22 of cabinet 12 and have the same supplied to him by a clerk positioned in rear of cabinet 12, who is capable of removing the foodstuffs through a rear door structure 24. However, where desired, the cabinet may be provided with doors which open from the front side wherein the customer is free to serve himself, as is frequently the case in dispensing dairy products or the like within self-service stores. Cabinets of either type are generally well-known.

Extending forwardly from the cabinet and from an area beneath window 20 is a second compartment 26 in the form of an open topped well which is formed as a continuation of the end walls 14 and 16 and formed integral with the cabinet 12. Compartment 26 is formed of front wall 28, rear wall 30, which is in fact the front wall of cabinet 10, end walls 32 and 34, and a lower wall 36, and measures about one foot in width so as not to prevent a customer from closely approaching window 20. As shown in cross section in Fig. 2, walls 28, 30 and 36, and top 18, as is equally true of walls 32 and 34 and the lower parts of compartment 22, including wall 19 are filled with insulation material 38. Within its interior, compartment 26 is provided with a continuous metal lining 40.

As shown in Fig. 2, compartment 22 is cooled by a coil 42 which extends along the under surface of the compartment above wall 19. Above coil 42 within compartment 22 is a perforated tray 44 on which perishable foodstuffs are suitably displayed. There is also provided within compartment 22 a refrigeration conduit 46 in the upper portion of the compartment, said conduit being provided with lateral fins 48 so as to provide heat transfer with the air within compartment 22. Also shown in Fig. 2 are a plurality of refrigeration coils 50 for cooling compartment 26 which are on one side of and united to the metal lining 40, as by welding or other means of rigid attachment. On their forward side coils 50 are suitably covered and protected from the insulation material 38 by a strip of metal 52.

A conduit 54 extends into a space 56 beneath compartment 22 and in rear of compartment 26. The conduit 54 extends from a source of fluid refrigerant, not shown, to coil 42. The flow of refrigerant from conduit 54 to coil 42 and conduit 46 is controlled by a conventional expansion valve 58 which is in turn controlled by a thermostatic bulb 60 in contact with a portion of coil 42. Extending from conduit 54 is a branch 62 which joins the lower end of coil 50. An expansion valve 64 controlled by a thermostatic bulb 66 shown connected to the outlet connection from coil 50 regulates the flow of refrigerant fluid through coil 50. The outlet connections from coil 42 and coil 50 are not completely shown, but are conventional in their connection to a refrigeration plant. The foregoing arrangement is suitable to provide fluid refrigerant to coil 42, pipe 46, and coil 50, when the capacity of the refrigeration plant is suitable to provide cooling fluid for both compartments. As our invention is of such a nature that compartment 26 could be formed on the forward surface of a conventional refrigeration cabinet in which the refrigerant plant would not have capacity to furnish the additional refrigeration for compartment 26 other means may be used to cool compartment 26. In such an instance an additional conduit 68, shown in Fig. 3, may extend from a second refrigeration plant to the expansion valve 64 to furnish the refrigerant fluid needed for compartment 26.

A highly important feature of the invention resides in the dimensions of compartment 26. The compartment has been previously described as being narrow, and this has particular significance insofar as its use for storing frozen food packages, and in minimizing the accumulation of frost on the interior of the compartment. Various forms of frozen foods are all packed in cartons of more or less standard dimensions, and to a large extent this is true of the products of various packers. Most packages measure about four inches in width and are of slightly greater length. The width of the compartment conforms with one of these measurements.

As shown in Fig. 2, a plurality of packages 70 are disposed one on top of the other in compartment 26. The distance between the front and rear walls of metal lining 40 is slightly greater than one dimension of the packages 70, which in this case is the lateral measurement of four inches. The arrangement brings a lateral surface of each package in close proximity to the cold forward wall of compartment 26 so that heat transfer may occur directly between coil 50 and each package through the metal lining 40. However, in addition to providing adequate refrigeration to each package, the fact that compartment 26 is relatively narrow and is open only on the top, minimizes the circulation of air through the compartment, and thus, even when the supply of packages is depleted, there is only a slight amount of frost accumulated on the inner walls of metal lining 40 since the air therein tends to remain relatively stagnant.

The particular advantages of the invention reside in the reduction of floor space within a store and also the reduction in cost necessary to provide suitable refrigeration for frozen food packages.

Our invention is defined in the terms of the appended claims.

We claim:

1. In combination with a display type refrigeration cabinet embodying a compartment having a front wall which is principally composed of glass, an open topped compartment positioned on the front of the cabinet beneath the glass surface and exterior to the first named compartment and having one wall in common with the first named compartment, and means for refrigerating the space within each of said compartments.

2. In combination with a display type refrigeration cabinet embodying a compartment having a bottom wall and a front wall, the latter being principally composed of glass, an open topped compartment positioned on the front of the cabinet beneath the glass surface and exterior to the first named compartment, the upper open end of the second compartment extending above the bottom wall of the first compartment, and means for refrigerating the space within each of said compartments.

3. In combination with a display type refrigeration cabinet embodying a compartment having a bottom wall and a front wall, the latter being principally composed of glass, and open topped compartment positioned on the front of the cabinet beneath the glass surface and exterior to the first named compartment and having one wall in common with the first named compartment, the upper open end of the second compartment extending above the bottom wall of the first compartment, and independent means for refrigerating the space within each of said compartments.

4. In combination with a display type refrigeration cabinet embodying an enclosed compartment having a bottom wall and a front wall, the latter being principally composed of glass, an open topped well composed of front, bottom and end walls positioned on the forward surface of the cabinet and exterior to said compartment and having its rear wall in common with the front wall of the compartment, the upper open end of the well extending above the bottom wall of the compartment, and refrigerating means within one of said walls for cooling the space within said well.

5. In combination with a display type refrigeration cabinet embodying an enclosed compartment having a bottom wall and a front wall, the latter being principally composed of glass, an open topped well composed of front, bottom and end walls positioned on the forward surface of the cabinet and exterior to said compartment and having its rear wall in common with the front wall of the compartment, the upper open end of the well extending above the plane of the bottom wall of the compartment, a metal lining forming the interior surfaces of the walls of said well, and a refrigeration coil united to said metal lining within one of said walls to provide heat transfer through said lining within the interior of said well.

6. In combination with a display type cabinet embodying a compartment enclosed with lateral spaced apart end walls and a forward surface which is principally composed of a transparent material, a relatively narrow open topped well united with the end walls and positioned on the forward exterior surface of the cabinet beneath the transparent surface, a first heat exchange member within the enclosed compartment, a second heat exchange member within the open topped well, and means connecting each of said heat exchange members with a common source of refrigerant.

7. In combination with a display type cabinet embodying a compartment enclosed with laterally spaced apart end walls and front and rear walls, said front wall having an angularly sloping surface which terminates in a vertical surface that extends substantially to the base of the cabinet, said angularly sloping surface being composed principally of a transparent material, a narrow open topped well formed of front, bottom and end walls united with the end walls and forward surface of the cabinet and positioned on the front of the cabinet beneath the angularly sloping surface and exterior to said compartment, a refrigerant evaporator mounted in one wall of said well, and a metal plate secured to the outer surface of said evaporator and forming an inner heat transfer surface within said chamber.

ROBERT E. SKOOG.
JOHN B. SKOOG.

REFERENCES CITED

The following references are of record in the file of this patent:

UNITED STATES PATENTS

| Number | Name | Date |
|---|---|---|
| 2,429,294 | Pollock | Oct. 21, 1947 |